US008640351B2

(12) United States Patent   (10) Patent No.: US 8,640,351 B2
Chang   (45) Date of Patent: Feb. 4, 2014

(54) MULTIFUNCTION MEASURING DEVICE

(76) Inventor: Shen-Wei Chang, Taichung City (TW)

( * ) Notice: Subject to any disclaimer, the term of this patent is extended or adjusted under 35 U.S.C. 154(b) by 194 days.

(21) Appl. No.: 13/430,205

(22) Filed: Mar. 26, 2012

(65) Prior Publication Data

US 2013/0160311 A1   Jun. 27, 2013

(30) Foreign Application Priority Data

Dec. 23, 2011  (TW) .............................. 100148384 A

(51) Int. Cl.
*G01C 17/00* (2006.01)
*G01C 9/00* (2006.01)

(52) U.S. Cl.
USPC ............................. 33/352; 33/355 R; 33/365

(58) Field of Classification Search
USPC ......................... 33/352, 354, 355 R, 365, 391
See application file for complete search history.

(56) References Cited

U.S. PATENT DOCUMENTS

| | | | | |
|---|---|---|---|---|
| 4,188,729 A * | 2/1980 | Peterson | ........................ | 33/391 |
| 4,485,825 A * | 12/1984 | Domjan et al. | ................. | 33/352 |
| 6,243,660 B1 * | 6/2001 | Hsu et al. | ........................ | 33/319 |
| 6,701,631 B1 * | 3/2004 | Monteiro et al. | ............... | 33/352 |
| 8,006,397 B2 * | 8/2011 | Schubert | .................... | 33/366.27 |
| 2002/0083604 A1 * | 7/2002 | Iden | ................ | 33/354 |
| 2002/0104224 A1 * | 8/2002 | Barker | ........................ | 33/355 R |
| 2013/0239422 A1 * | 9/2013 | Kang et al. | ...................... | 33/354 |

* cited by examiner

*Primary Examiner* — G. Bradley Bennett
(74) *Attorney, Agent, or Firm* — Christensen O'Connor Johnson Kindness PLLC

(57) ABSTRACT

A multifunction measuring device includes: an orientation compass and an inclinometer mounted in a mounting seat and disposed in a housing so that the orientation compass and the inclinometer are respectively exposed through front and rear openings in the housing; a first magnification member disposed in the housing, connected movably to a connecting seat fixed in the housing, and including a first magnifying lens aligned with a first viewing hole in the housing; and a second magnification member connected movably to the housing, and including a second magnifying lens aligned with a second viewing hole in the housing.

11 Claims, 9 Drawing Sheets

MULTIFUNCTION MEASURING DEVICE

CROSS-REFERENCE TO RELATED APPLICATION

This application claims priority to Taiwanese Application No. 100148384, filed on Dec. 23, 2011.

BACKGROUND OF THE INVENTION

1. Field of the Invention

The invention relates to a measuring instrument, and more particularly to a multifunction measuring device.

2. Description of the Related Art

Referring to FIG. 1, a conventional measuring instrument 10 is shown to include: a housing 11; an inclinometer 12 and an orientation compass 13 mounted to a mounting surface of the housing 11; a first magnification-adjusting member 14 mounted to the housing 11, and operable to adjust an adequate focal distance for a user's eye so as to enable a built-in first magnifying lens (not shown) to adequately magnify scales on a scale ring 122 of the inclinometer 12 such that inclination angle information of the user's location can be clearly read from the scale ring 122 by the user; and a second magnification-adjusting member 15 mounted to the housing 11, and operable to adjust an adequate focal distance for a user's eye so as to enable a built-in second magnifying lens (not shown) to adequately magnify scales on a scale ring 132 of the orientation compass 13 such that orientation information of the user's location can be clearly read from the scale ring 132 by the user. Alternatively, the inclination angle information of the user's location can also be read from an inclinometer scale 121 of the inclinometer 12, and the orientation information of the user's location can also be read from a compass scale 131 of the orientation compass 13.

However, since the inclinometer 12 and the orientation compass 13 are mounted to the same mounting surface of the housing 11, the conventional measuring instrument 10 has a relatively large size in length, and is inconvenient to carry.

SUMMARY OF THE INVENTION

Therefore, an object of the present invention is to provide a multifunction measuring device that can overcome the aforesaid drawbacks of the prior art.

According to the present invention, a multifunction measuring device of the present invention comprises:

a housing having a front side formed with a front opening, a rear side formed with a rear opening that is aligned coaxially with the front opening, opposite lateral ends, one of which is formed with a first viewing hole, a top end formed with a second viewing hole, and a bottom end;

a mounting seat mounted fixedly in the housing and disposed coaxially with the front and rear openings in the housing;

an orientation measuring unit including an orientation compass mounted in the mounting seat, and having a compass scale exposed through the front opening in the housing, and a first scale ring visible through the first viewing hole in the housing, a connecting seat mounted fixedly in the housing, disposed adjacent to the mounting seat and formed with a through hole aligned with the first viewing hole in the housing, and a first magnification member including a tubular body, which has a connecting end portion extending into the through hole in the connecting seat and connected movably to the connecting seat, and an operating end portion opposite to the connecting end portion and extending outward of the housing through the first viewing hole, and a first magnifying lens mounted in the tubular body; and an inclination angle measuring unit including an inclinometer mounted in the mounting seat, and having an inclinometer scale exposed through the rear opening in the housing, and a second scale ring visible through the second viewing hole in the housing, and a second magnification member including a lens-mounting seat mounted on the housing and movable up and down relative to the housing, and a second magnifying lens mounted in the lens-mounting seat and disposed above the second viewing hole in the housing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
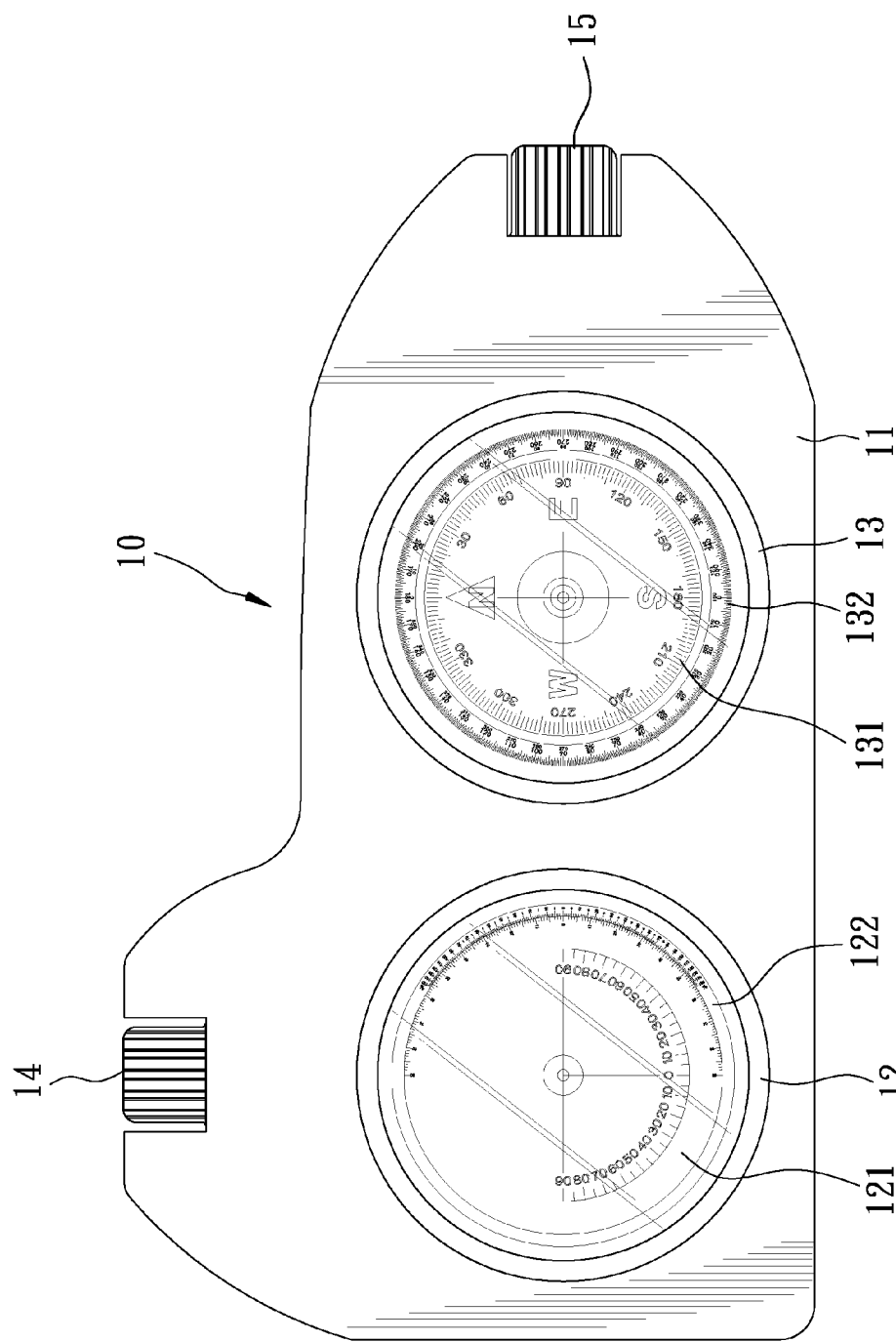
FIG. 1 is a schematic front view of a conventional measuring instrument.
Figure 2:
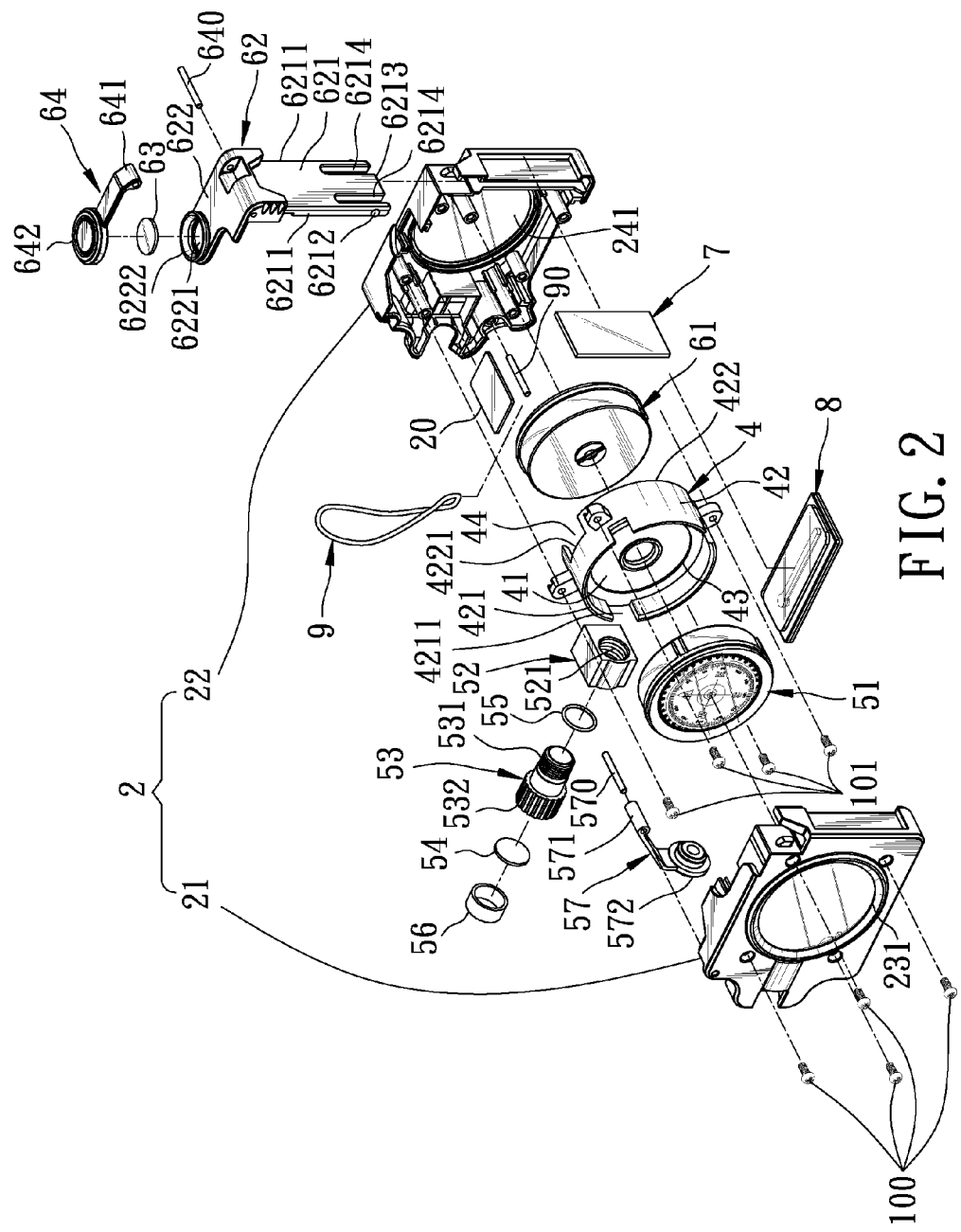
FIG. 2 is an exploded perspective view showing the preferred embodiment of a multifunction measuring device according to the present invention.
Figure 3:
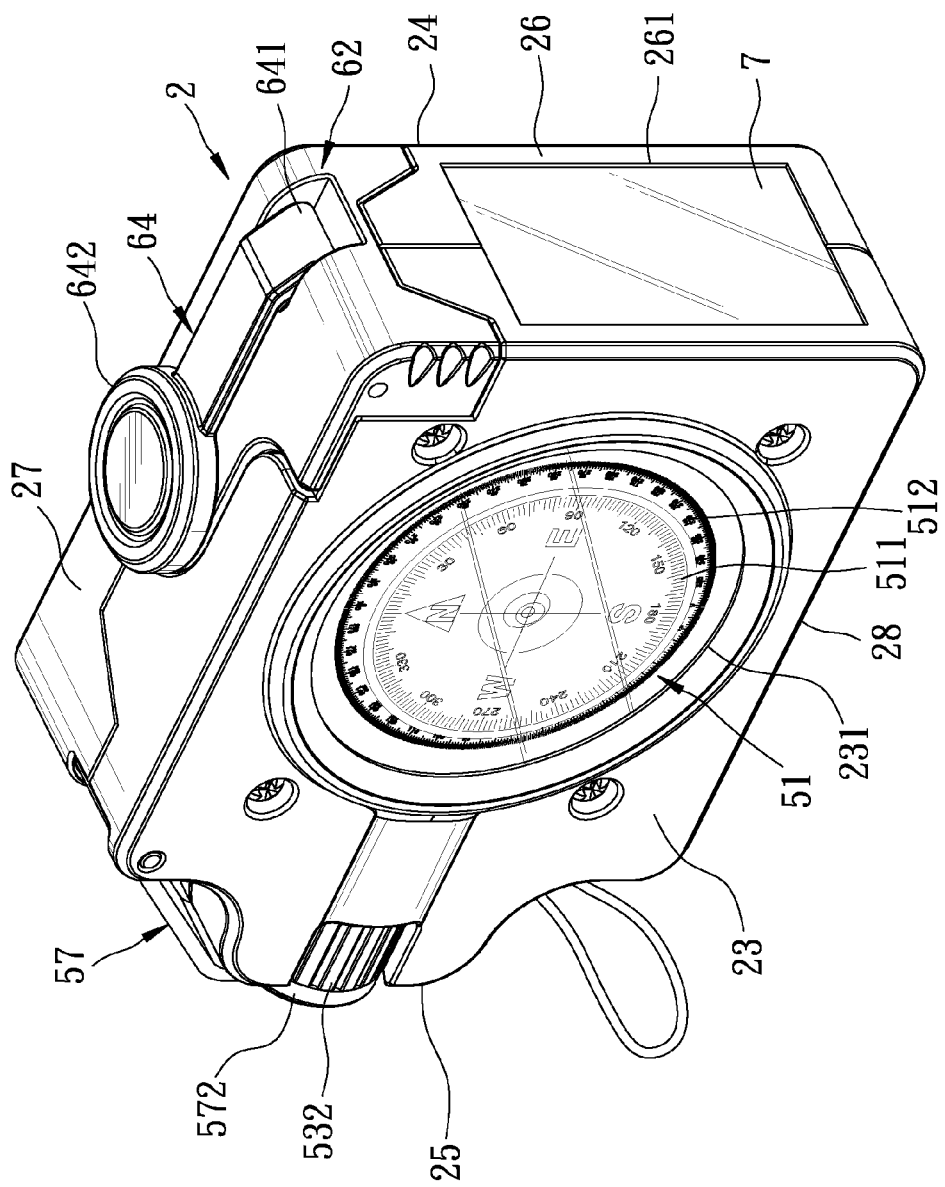
FIG. 3 is an assembled front perspective view showing the preferred embodiment.
Figure 4:
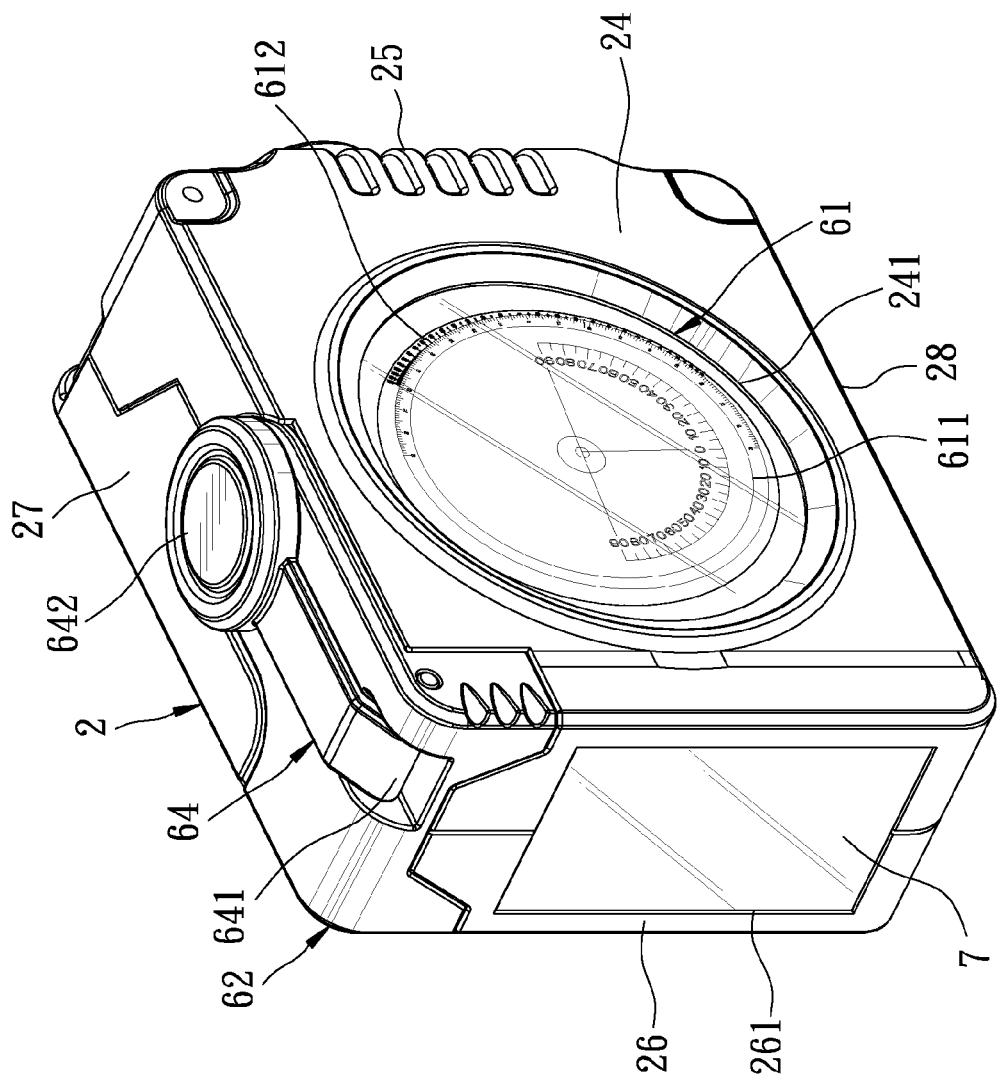
FIG. 4 is an assembled rear perspective view showing the preferred embodiment.

Referring to FIGS. 2 to 4, the preferred embodiment of a multifunction measuring device according to the present invention is shown to include a housing 2, a mounting seat 4, an orientation measuring unit, an inclination angle measuring unit, a mirror 7, a thermometer 8, and a hanging rope 9.

Figure 6:
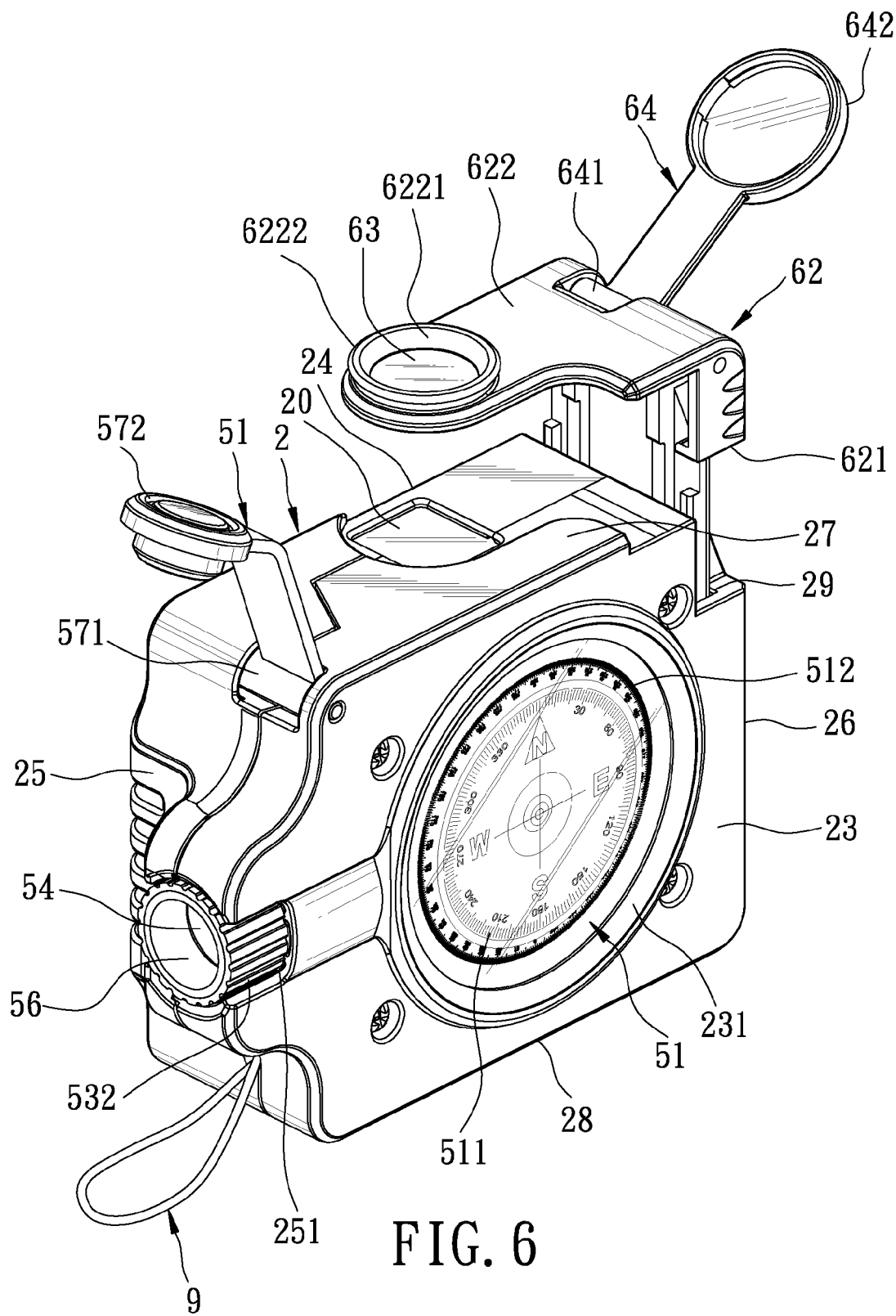
FIG. 6 is a front perspective view showing the preferred embodiment when in a state of use.

The housing 2 has opposite front and rear sides 23, 24, opposite lateral ends 25, 26, and opposite top and bottom ends 27, 28. The front side 23 is formed with a front opening 231. The rear side 24 is formed with a rear opening 241 aligned coaxially with the front opening 231 in the front side 23. The lateral end 25 is formed with a first viewing hole 251, and the top end 27 is formed with a second viewing hole 271, as best shown in FIG. 6.

In this embodiment, the housing 2 includes complementary front and rear housing parts 21, 22 connected to each other using a plurality of screw fasteners 100. The front housing part 21 is formed with the front opening 231. The rear housing 22 is formed with the rear opening 241. The front housing 21 cooperates with the rear housing 22 to define the first and second viewing holes 251, 271, and an insertion groove 29 (see FIG. 6) therebetween. The insertion groove 29 extends downward from the top end 27 of the housing 2, and is disposed adjacent to the lateral end 26 of the housing 2. In addition, referring further to FIG. 5, the insertion groove 29 is defined by a U-shaped groove-defining wall 291. The U-shaped groove-defining wall 291 includes opposite front and rear wall portions 291, 292, wherein the front wall portion 291 is a part of the front housing 21, and the rear wall portion 292 is a part of the rear housing 22. Each of the front and rear wall portions 291, 292 is formed with a plurality of positioning holes 2911, 2921. Furthermore, a transparent dust-proof piece 20 is mounted in the housing 2 for covering the second viewing hole 271 in the top end 27 of the housing 2.

The mounting seat 4 is mounted fixedly in the housing 2, and is disposed coaxially with the front and rear openings 231, 241 in the housing 2. In this embodiment, the mounting seat 4 includes a barrel body 42 connected to the rear housing part 22 using a plurality of screw fasteners 101 (see FIG. 2), and a partition plate 41 mounted in the barrel body 42 and cooperating with the barrel body 42 to define a front receiving space 43 and a rear receiving space 44. The barrel body 42 has opposite front and rear end 421, 422. The front end 421 of the barrel body 42 is formed with a front notch 4211 that is in spatial communication with the front receiving space 43 and that is aligned with the first viewing hole 251 in the housing 2. The rear end 422 of the barrel body 42 is formed with a rear notch 4221 that is in spatial communication with the rear receiving space 44 and that is aligned with the second viewing hole 271 in the housing 2.

The orientation measuring unit includes an orientation compass 51, a connecting seat 52, and a first magnification member.

The orientation compass 51 is mounted in the mounting seat 4, and is received in the front receiving space 43 in the mounting seat 4. The orientation compass 51 has a compass scale 511 exposed through the front opening 231 in the housing 2, and a first scale ring 512 visible through the first viewing hole 251 and the front notch 4211 in the barrel body 42 of the mounting seat 4.

The connecting seat 52 is mounted fixedly in the housing 2, and is disposed adjacent to the mounting seat 4. The connecting seat 52 is formed with a through hole 521 that is aligned with the front notch 4211 in the barrel body 42 of the mounting seat 4 and the first viewing hole 251 in the housing 2. In this embodiment, the through hole 521 is a screw hole.

The first magnification member includes a tubular body 53, a first magnifying lens 54, a washer 55, an anchoring ring 4, and a protection cover 57. The tubular body 53 has a connecting end portion 531 with an annular outer thread surface extending into the through hole 521 in the connecting seat 52 and connected movably to the connecting seat 52, and an enlarged operating end portion 532 opposite to the connecting end portion 531 and extending outward of the housing 2 through the first viewing hole 251 (see FIG. 6). The first magnifying lens 54 is mounted in the tubular body 53, and is received in the operating end portion 532 of the tubular body 53. The washer 55 is sleeved on the connecting end portion 531 of the tubular body 53. The anchoring ring 56 is disposed fittingly in the operating end portion 532 of the tubular body 53 for anchoring the first magnifying lens 54 in the tubular body 53. The protection cover 57 has a pivot end 571 connected pivotally to the housing 1 using a pivot rod 570 fixed in the housing 1, and a cover end 572 opposite to the pivot end 571. In this embodiment, the cover end 572 of the protection cover 57 is in the form of a plug. The protection cover 57 is operable so that the cover end 572 plugged into and connected to the operating end portion 532 of the tubular body 53 so as to cover the first magnifying lens 54 in the tubular body 53 (see FIG. 3).

In use, as best shown in FIG. 6, the cover end 572 of the protection cover 57 is moved away from the operating end portion 532 of the tubular body 53. Thereafter, the operating end portion 532 is rotated to adjust a distance between the first magnifying lens 54 and the first scale ring 512, i.e., an adequate focal distance for a user's eye, so as to enable the first magnifying lens 54 to adequately magnify scales on the first scale ring 512 of the orientation compass 51 such that orientation information of the user's location can be clearly read from the first scale ring 512 of the orientation compass 51 by the user.

The inclination angle measuring unit includes an inclinometer 61, and a second magnification member.

The inclinometer 61 is mounted in the mounting seat 4, and is received in the rear receiving space 44 in the mounting seat 4. The inclinometer 61 has an inclinometer scale 611 exposed through the rear opening 241 in the housing 2, and a second scale ring 612 visible through the second viewing hole 271 and the rear notch 4221 in the barrel body 42 of the mounting seat 4.

The second magnification member includes a lens-mounting seat 62, a second magnifying lens 63, and a protection cover 64. The lens-mounting seat 62 is mounted on the housing 2, and is movable up and down relative to the housing 2.

Figure 5:
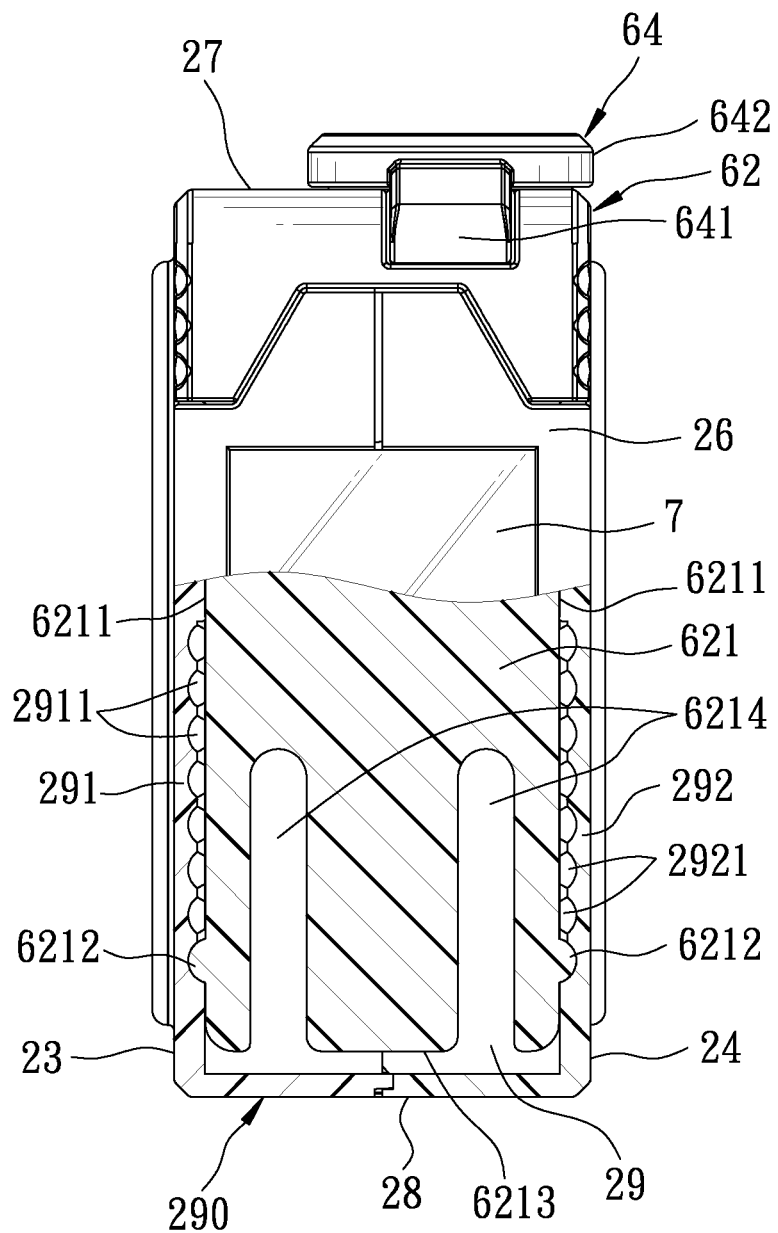
FIG. 5 is a partially sectional schematic side view illustrating the preferred embodiment when a lens-mounting seat is in a retracted position.
Figure 8:
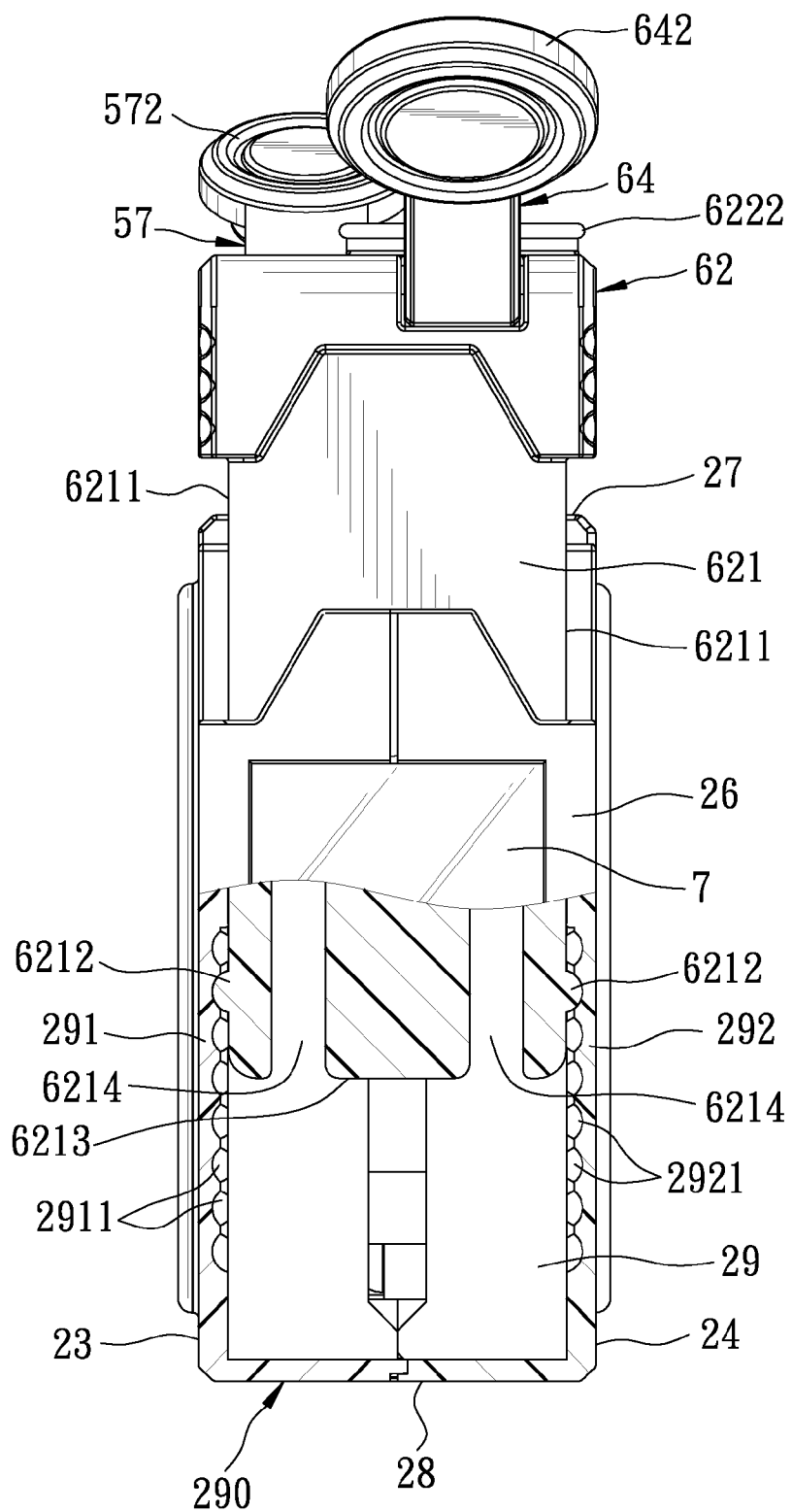
FIG. 8 is a partially sectional schematic side view illustrating the preferred embodiment when the lens-mounting seat is in a raised position.

In this embodiment, the lens-mounting seat 62 includes a vertical insertion block 621 inserted movably into the insertion groove 29 in the housing 2, and a horizontal extension plate 622 connected to the vertical insertion block 621 and disposed above the top end 27 of the housing 2. The vertical insertion block 621 has front and rear ends 6211 each formed with an engaging protrusion 6212 that engages releasably a selected one of the positioning holes 2911, 2912 in a corresponding one of the front and rear wall portions 291, 292 of the groove-defining wall 290 of the housing 2, thereby positioning the lens-mounting seat 62 in a desired position, as shown in FIGS. 5 and 8, wherein FIG. 5 illustrates the lens-mounting seat 62 when positioned in a retracted position, and FIG. 8 illustrates the lens-mounting seat 62 when positioned in a raised position. In addition, as shown in FIGS. 5 and 8, the vertical insertion block 621 has a bottom end 6213 formed with two upward extending slots 6214. The horizontal extension plate 622 is formed with a lens-mounting hole 6221 aligned with the second viewing hole 271 in the housing 2 and mounted with the second magnifying lens 63 therein. The lens-mounting seat 62 further has an annular engaging flange 6222 extending upward from the horizontal extension plate 622 and surrounding the lens-mounting holes 6221.

The protection cover 64 has a pivot end 641 connected pivotally to the lens-mounting seat 62 using a pivot rod 640 fixed in the lens-mounting seat 62, and a cap end 642 opposite to the pivot end 641. The protection cover 64 is operable so that the cap end 642 is connected to the annular engaging flange 6222 of the horizontal extension plate 622 so as to cover the second magnifying lens 63 in the lens-mounting seat 62 (see FIG. 4).

Figure 7:
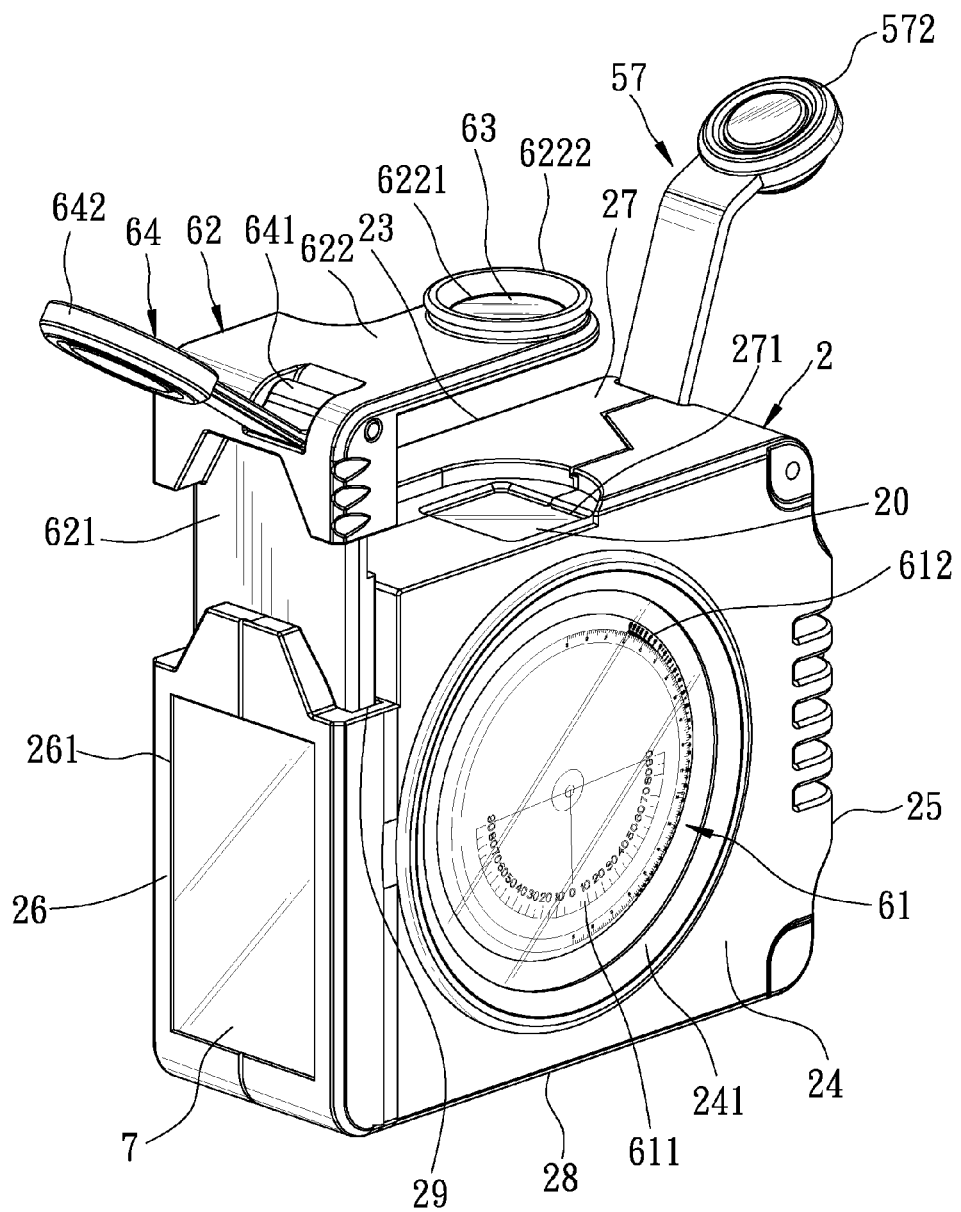
FIG. 7 is a rear perspective view showing the preferred embodiment when in the state of use.

In use, as best shown in FIG. 7, the cap end 642 of the protection cover 64 is moved away from the annular engaging flange 6222 of the lens-mounting seat 62. Thereafter, the lens-mounting seat 62 is moved up or down to adjust a distance between the second magnifying lens 63 and the second scale ring 612 of the inclinometer 61, i.e., an adequate focal distance for a user's eye, so as to enable the second magnifying lens 63 to adequately magnify scales on the second scale ring 612 of the inclinometer 61 such that inclination angle information of the user's location can be clearly read from the second scale ring 612 of the inclinometer 61 by the user.

The mirror 7 is mounted on the lateral end 26 of the housing 2, and is received in a mirror-receiving groove in the lateral end 26 of the housing 2, as shown in FIGS. 4 and 7. When the multifunction measuring device is used in outdoor applications, the mirror 7 is regarded as a reflector for field help.

Figure 9:
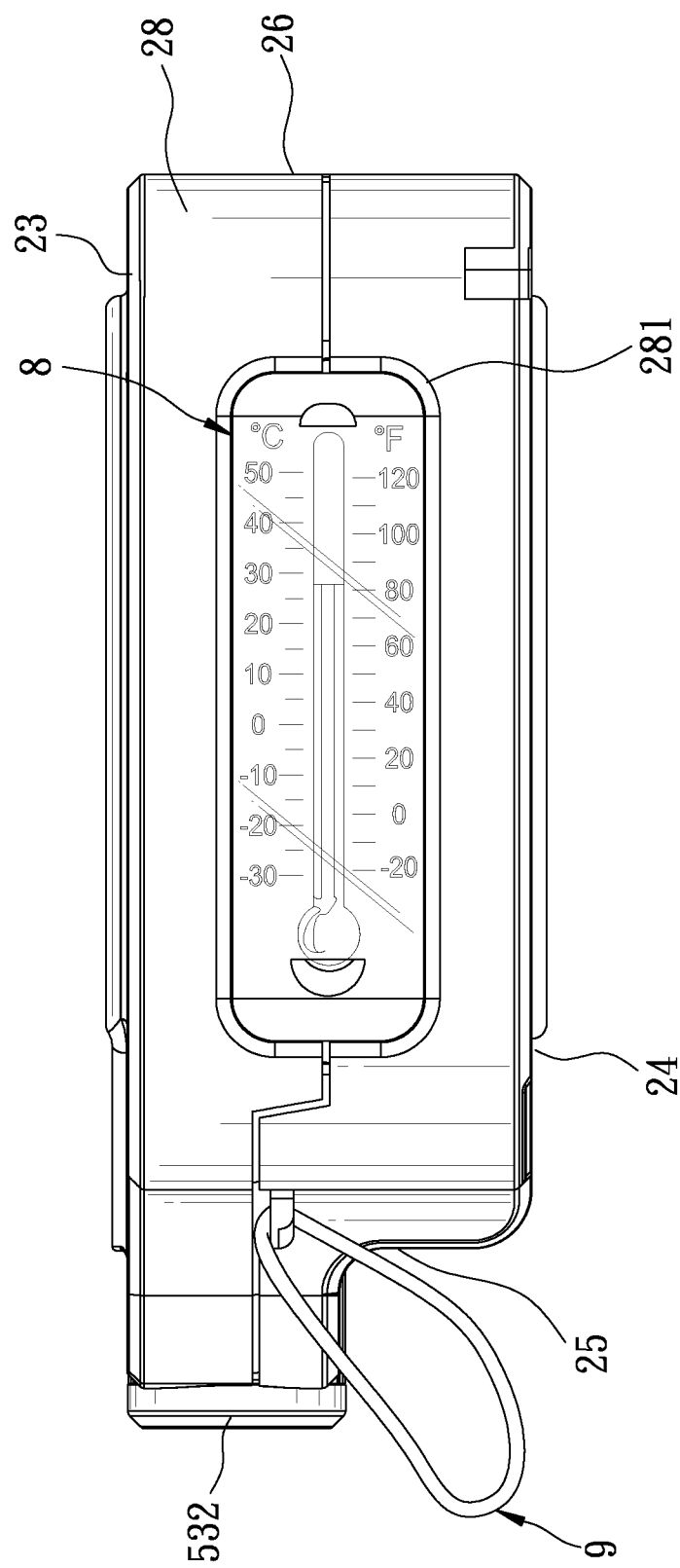
FIG. 9 is a schematic bottom view showing the preferred embodiment.

The thermometer 8 is mounted on the bottom end 28 of the housing 2, and is received in a thermometer-receiving groove 281 in the bottom end 28 of the housing 2, as shown in FIG. 9.

The hanging rope 9 is connected to the housing 2 using a connecting rod 90 mounted in the housing 2, and extends outward of the housing 2, thereby facilitating carrying of the multi-function measuring device.

In sum, since the orientation compass 51 and the inclinometer 61 are mounted respectively in the front and rear sides 23, 24 of the housing 2, the multifunction measuring device of the present invention has a compact size, and is convenient to carry.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A multifunction measuring device comprising:
   a housing having a front side formed with a front opening, a rear side formed with a rear opening that is aligned coaxially with said front opening, opposite lateral ends, one of which is formed with a first viewing hole, a top end formed with a second viewing hole, and a bottom end;
   a mounting seat mounted fixedly in said housing and disposed coaxially with said front and rear openings in said housing;
   an orientation measuring unit including
      an orientation compass mounted in said mounting seat, and having a compass scale exposed through said front opening in said housing, and a first scale ring visible through said first viewing hole in said housing,
      a connecting seat mounted fixedly in said housing, disposed adjacent to said mounting seat and formed with a through hole aligned with said first viewing hole in said housing, and
      a first magnification member including a tubular body, which has a connecting end portion extending into said through hole in said connecting seat and connected movably to said connecting seat, and an operating end portion opposite to said connecting end portion and extending outward of said housing through said first viewing hole, and a first magnifying lens mounted in said tubular body; and
   an inclination angle measuring unit including
      an inclinometer mounted in said mounting seat, and having an inclinometer scale exposed through said rear opening in said housing, and a second scale ring visible through said second viewing hole in said housing, and
      a second magnification member including a lens-mounting seat mounted on said housing and movable up and down relative to said housing, and a second magnifying lens mounted in said lens-mounting seat and disposed above said second viewing hole in said housing.

2. The multifunction measuring device as claimed in claim 1, wherein:
   said housing includes complementary front and rear housing parts, said front housing part being forming with said front opening, said second housing part being formed with said rear opening, said front housing part cooperating with said rear housing part to define said first and second viewing holes, and an insertion groove therebetween, said insertion groove extending downward from said top end of said housing, and being disposed adjacent to the other one of said lateral ends of said housing; and
   said lens-mounting seat of said second magnification member includes a vertical insertion block inserted movably into said insertion groove in said housing, and a horizontal extension plate connected to said vertical insertion block, disposed above said top end of said housing and mounted with said second magnifying lens therein.

3. The multifunction measuring device as claimed in claim 2, wherein said second magnification member of said inclination angle measuring unit further includes a protection cover connected pivotally to said lens-mounting seat and operable to connect said horizontal extension plate so as to cover said second magnifying lens.

4. The multifunction measuring device as claimed in claim 2, wherein:
   said vertical insertion block of said lens-mounting seat of said second magnification member having front and rear ends each formed with an engaging protrusion; and
   said housing further has a U-shaped groove-defining wall defining said insertion groove in said housing and including opposite front and rear wall portions each formed with a plurality of positioning holes, said engaging protrusion of each of said front and rear ends of said vertical insertion block engaging releasably a selected one of said positioning holes in a corresponding one of said front and rear wall portions of said groove-defining wall of said housing, thereby positioning said lens-mounting seat in a desired position.

5. The multifunction measuring device as claimed in claim 4, wherein said vertical insertion block of said lens-mounting seat has a bottom end formed with two upward extending slots.

6. The multifunction measuring device as claimed in claim 1, further comprising a transparent dust-proof piece mounted in said housing for covering said second viewing hole in said housing.

7. The multifunction measuring device as claimed in claim 1, wherein said first magnification member of said orientation measuring unit further includes a protection cover connected pivotally to said housing and operable to connect said operating end portion of said tubular body so as to cover said first magnifying lens in said tubular body.

8. The multifunction measuring device as claimed in claim 1, wherein said mounting seat includes a barrel body, and a partition plate mounted in said barrel body and cooperating with said barrel body to define a front receiving space for receiving said orientation compass, and a rear receiving space for receiving said inclinometer, said barrel body having a front end formed with a front notch that is in spatial communication with said front receiving space and that is aligned with said through hole in said connecting seat of said orientation measuring unit, and a rear end formed with a rear notch that is in spatial communication with said rear receiving space and that is aligned with said second viewing hole in said housing.

9. The multifunction measuring device as claimed in claim 1, further comprising a mirror mounted on the other one of said lateral ends of said housing.

10. The multifunction measuring device as claimed in claim 1, further comprising a thermometer mounted on said bottom end of said housing.

11. The multifunction measuring device as claimed in claim 1, further comprising a hanging rope connected to said housing and extending outward of said housing.

\* \* \* \* \*